United States Patent
Katayama et al.

(10) Patent No.: US 6,473,546 B2
(45) Date of Patent: Oct. 29, 2002

(54) OPTICAL MULTIPLEXER/DEMULTIPLEXER

(75) Inventors: Makoto Katayama, Yokohama (JP); Masayuki Nishimura, Yokohama (JP); Shigeru Tanaka, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 09/915,292

(22) Filed: Jul. 27, 2001

(65) Prior Publication Data

US 2002/0012496 A1 Jan. 31, 2002

Related U.S. Application Data

(60) Provisional application No. 60/221,514, filed on Jul. 28, 2000.

(51) Int. Cl.[7] ............................. G02B 6/28; G02B 6/26; H04J 14/00; H04J 14/02
(52) U.S. Cl. ............................. 385/24; 385/27; 385/37; 359/115; 359/127; 359/130
(58) Field of Search ............................. 385/14, 15, 24, 385/27, 37, 42, 43, 46, 50, 129–131; 359/115, 116, 123, 124, 127, 130, 131

(56) References Cited

U.S. PATENT DOCUMENTS

| | | | | |
|---|---|---|---|---|
| 5,212,758 A | * | 5/1993 | Adar et al. ............... | 385/129 |
| 5,841,919 A | * | 11/1998 | Akiba et al. ............... | 385/37 |
| 6,058,233 A | * | 5/2000 | Dragone .................. | 385/46 |
| 6,222,956 B1 | * | 4/2001 | Akiba et al. ............... | 385/24 |
| 6,389,201 B1 | * | 5/2002 | Urino ........................ | 385/43 |
| 6,393,170 B1 | * | 5/2002 | Nakajima et al. ........... | 385/14 |
| 6,404,946 B1 | * | 6/2002 | Nakajima et al. ........... | 385/24 |
| 6,415,072 B1 | * | 7/2002 | Hashizume et al. ......... | 385/24 |
| 6,418,249 B1 | * | 7/2002 | Nakamura et al. .......... | 385/24 |

OTHER PUBLICATIONS

Masao Tsuruta, "Applied Physical Engineering Selection 1, Applied Optics I," Aug. 31, 1990, pp. 230–233 (w/English translation).

* cited by examiner

Primary Examiner—Brian Healy
Assistant Examiner—Kevin J Wood
(74) Attorney, Agent, or Firm—McDermott, Will & Emery

(57) ABSTRACT

The present invention relates to an AWG type optical multiplexer/demultiplexer having a small size in a state where cross talk is effectively restrained from increasing between adjacent channels. The optical multiplexer/demultiplexer is designed such that, in a power spectrum indicating a wavelength-transmission characteristic concerning an output light component from selected one of output waveguides disposed so as to correspond to respective signals having channel wavelengths set with a predetermined wavelength spacing, an adjacent channel wavelength exists within a wavelength region yielding an output light power lower than that at the channel wavelength corresponding to the selected one by 20 dB or more, whereby the cross talk between adjacent channels occurring as the optical multiplexer/demultiplexer attains a smaller size is effectively suppressed.

11 Claims, 5 Drawing Sheets

OPTICAL MULTIPLEXER/DEMULTIPLEXER

CROSS-REFERENCE TO RELATED APPLICATION

This application claims priority to Provisional Application Ser. No 60/221,514 filed Jul. 28, 2000, which is hereby incorporated by reference in its entirety.

BACKGROUND OF THE INVENTION

1. Field of the Invention

The present invention relates to an optical multiplexer/demultiplexer of arrayed waveguide grating (AWG) type employable as a wavelength-selecting device in wavelength division multiplexing (WDM) transmission systems.

2. Related Background Art

AWG type optical multiplexer/demultiplexers (hereinafter referred to as AWG circuits) are widely utilized as a wavelength filter allowing a specific wavelength to be taken out or inserted upon interference in WDM transmission systems. Also, AWG circuits as a major optical component in future WDM transmission systems as well as their possibilities of integration with other waveguide devices are expected to develop, since they can be realized by a common fine working process such as lithography or etching without necessitating such precise machining as that of diffraction gratings or such precise multilayer formation as that of interference films.

Such an AWG circuit comprises a structure in which an input waveguide, an input slab waveguide, a plurality of channel waveguides having lengths different from each other (phased array), an output slab waveguide, and an output waveguide are formed integrally on a single substrate.

SUMMARY OF THE INVENTION

The inventors have studied the prior art mentioned above and, as a result, have found a problem as follows. Namely, in the case where the AWG circuit is to be made smaller, if it is simply made smaller by improving the precision in its processing, then cross talk may occur between channels to be separated from each other, whereby sufficient spectral characteristics may not be obtained.

Figure 1A:
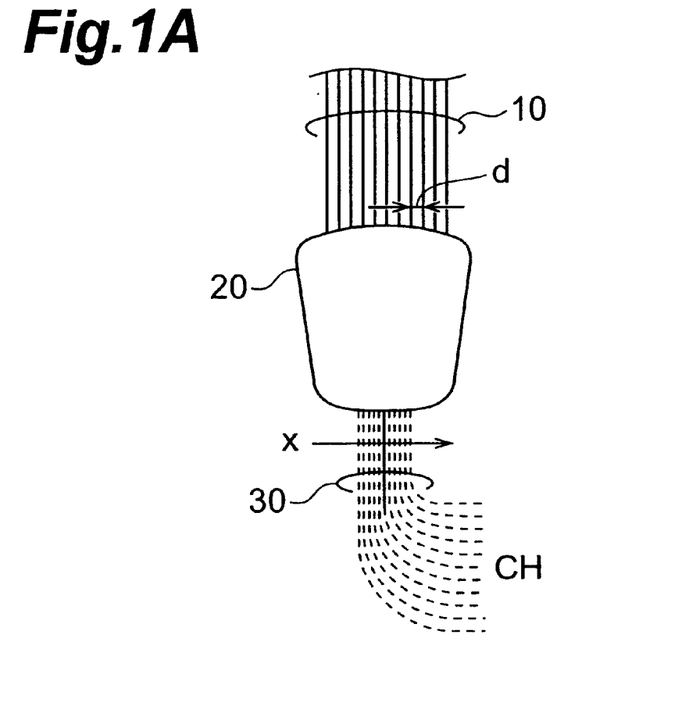
Figure 1B:
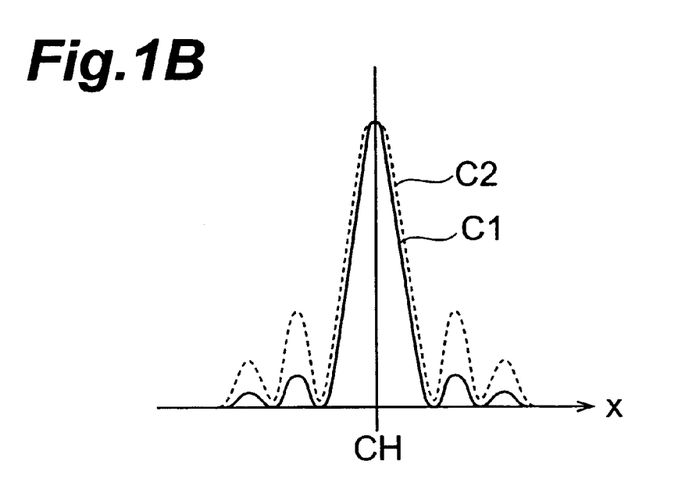
FIG. 1B is a chart for explaining a problem occurring as an optical multiplexer/demultiplexer is made smaller.

FIG. 1A is a view showing a waveguide configuration of an output part in an AWG circuit. In general, this AWG type optical multiplexer/demultiplexer comprises a structure in which a plurality of channel waveguides 10 having lengths different from each other are connected, at their one end, to one connection surface of an output slab waveguide 20 at intervals of d, whereas output waveguides 30 disposed so as to correspond to their respective channel wavelengths of light are connected, at their one end, to the other connection surface of the output slab waveguide 20. FIG. 1B shows a diffraction pattern of light having a channel wavelength corresponding to an output waveguide CH along a line X in FIG. 1A centered at the output waveguide CH.

Usually, when the interval of channel waveguides 10 and the slab length of slab waveguide 20 are designed so as to be secured sufficiently, the diffraction pattern of light to be guided to the output waveguide CH attains a practically unproblematic spectral characteristic in which secondary maximum peaks (side peaks) are relatively small as indicated by curve C1 in FIG. 1B.

In the case where such an AWG circuit is to be made smaller, the relative refractive index difference between the substrate part and waveguide part is set higher, e.g., raised to about 1.5% from its normal value of 0.3% to 0.7%, such that the radiation loss in the channel waveguides 10 becomes smaller even if their radius of curvature is made smaller. At the same time, the slab length of slab waveguide 20 (corresponding to the focal length of the lens surface located at the output end of each channel waveguide 10) and the like are reduced, whereby the AWG circuit as a whole can be made smaller.

If the output end interval d of channel waveguides 10 becomes too small as the AWG circuit as a whole is made smaller, then coupling may occur among the channel waveguides 10. Consequently, at the input end position of an output waveguide CH to take out a light component having a specific phase, a light component having a phase different therefrom arrives, whereby this output waveguide CH would output light in which these components are mixed. Namely, if the output end interval d of channel waveguides 10 is simply reduced, then there may occur a possibility of secondary maximum peaks increasing as shown in curve C2 of FIG. 1B and spectral characteristics remarkably deteriorating.

If the output end interval d of channel waveguides 10 is to be enhanced in order to keep the channel waveguides 10 from coupling with each other, then the number of channel waveguides 10 per se must be reduced. If the number of channel waveguides 10 decreases, then the secondary maximum peaks (side peaks) become greater relative to the main maximum peak (mainpeak), whereby the secondary maximum peaks increase as shown in curve C2 of FIG. 1B as in the above-mentioned case.

In order to overcome the above-mentioned problem, it is an object of the present invention to provide an optical multiplexer/demultiplexer which is made smaller in a state where the cross talk between adjacent channels is effectively restrained from increasing.

For achieving the above-mentioned problem, the present invention provides an optical multiplexer/demultiplexer of AWG type employable as a wavelength-selecting device in a WDM transmission system; the optical multiplexer/demultiplexer comprising a substrate, and one or more input waveguides, a first slab waveguide, a plurality of channel waveguides, a second slab waveguide, and a plurality of output waveguides which are disposed on the substrate.

In the optical multiplexer/demultiplexer according to the present invention, the first and second slab waveguides have respective predetermined slab lengths. Each slab length corresponds to the focal length of the lens surface located at the light input end in the respective slab waveguide. Each input waveguide is a waveguide for guiding to the first slab waveguide a respective signal having a channel wavelength set as a signal channel with a predetermined wavelength spacing, and has one end connected to the first slab waveguide. The plurality of channel waveguides are waveguides, disposed on the substrate, having lengths different from each other. One end of each channel waveguide is connected to the first slab waveguide such that the first slab waveguide is held between the input waveguide and the channel waveguide, whereas the other end of each channel waveguide is connected to the second slab waveguide such that the second slab waveguide is held between the channel waveguide and the output waveguides. Further, the output waveguides are waveguides each having one end connected to the second slab waveguide, and are disposed so as to discretely take out individual signals having channel wavelengths set with a predetermined wavelength spacing.

In the optical multiplexer/demultiplexer according to the present invention, in particular, at least the slab lengths in the first and second slab waveguides and the channel waveguide intervals at respective connection end faces of the first and second slab waveguides are adjusted such that, in a power spectrum indicating a wavelength-transmission characteristic concerning an output light component from selected one of the output waveguides, a second channel wavelength adjacent a first channel wavelength corresponding to the selected one in the channel wavelengths of signals exists within a wavelength region yielding an output light power lower than that at the first channel wavelength by 20 dB or more.

Thus, the slab lengths in the first and second slab waveguides and the channel waveguide intervals at respective connection end faces of the first and second slab waveguides, which greatly contribute to changing the form of the above-mentioned power spectrum, are mainly adjusted, whereby, in each output waveguide, light components other than its corresponding channel wavelength of light, such as light components having wavelengths adjacent the channel wavelength in particular, are effectively attenuated. As a result, cross talk is effectively restrained from occurring between adjacent channels as the optical multiplexer/demultiplexer is made smaller, whereby optical multiplexer/demultiplexers having desirable optical characteristics are obtained.

As modes for adjusting the spectrum form of output light power as mentioned above in relation to each channel wavelength which has been set beforehand as a signal channel with a predetermined wavelength spacing, those in the following can be realized, for example.

In a first mode, the slab lengths and channel waveguide intervals are adjusted such that the second channel wavelength exists between a main peak having a peak wavelength at the first channel wavelength and a first side peak, adjacent the main peak, yielding a power difference of 20 dB or less between the output light power at the peak wavelength thereof and the output light power at the first channel wavelength. Preferably, in the first mode, the slab lengths and channel waveguide intervals are adjusted such that a third channel wavelength, adjacent the second channel wavelength and different from the first channel wavelength, exists between a first side peak and a second side peak, adjacent the first side peak, yielding a difference of 20 dB or less between the output light power at the peak wavelength thereof and the output light power at the first channel wavelength.

In a second mode, the slab lengths and channel waveguide intervals are adjusted such that at least the peak wavelength of a first side peak adjacent a main peak having a peak wavelength at the first channel wavelength exists within a wavelength region between the first and second channel wavelengths. Namely, settings may be such that a plurality of side peaks exist between channel wavelengths adjacent each other.

In each of these modes, the second channel wavelength is set such that the signal wavelength spacing from the first channel wavelength to the second channel wavelength is greater or smaller than the wavelength spacing from the first channel wavelength to the peak wavelength of the first side peak by 20% or more. Namely, if an adjacent channel wavelength (second channel wavelength) is shifted from the peak wavelength of the first side peak by at least a predetermined wavelength spacing, then the cross talk between adjacent channels can fully be reduced in each output waveguide. Preferably, in the first mode, the third channel wavelength is set such that the signal wavelength spacing from the first channel wavelength to the third channel wavelength is greater or smaller than the wavelength spacing from the first channel wavelength to the peak wavelength of the second side peak by 20% or more.

For realizing a smaller size in the optical multiplexer/demultiplexer according to the present invention, it is preferred that the channel waveguide intervals at the respective connection end faces in the first and second slab waveguides be 15 $\mu$m or less. Preferably, the slab lengths in the first and second slab waveguides are 15 mm or less.

As the optical multiplexer/demultiplexer is made smaller, the radius of curvature of each waveguide becomes smaller, thereby increasing a possibility that signals propagating through individual waveguides being confined insufficiently. Hence, in the optical multiplexer/demultiplexer according to the present invention, it is preferred that the relative refractive index difference between the substrate and the waveguides though which the signals propagate be 1% or more.

For satisfying the demand for WDM transmissions in recent years, the number of channels corresponding to the number of signals is preferably 30 or more, whereas the channel wavelength spacing of individual signals is preferably 100 GHz or less.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 1A is a view showing a waveguide configuration of an output part in an optical multiplexer/demultiplexer, whereas

FIG. 6A is a graph showing a relationship between an output light power spectrum of an optical multiplexer/demultiplexer whose slab length and channel waveguide interval are set as a comparative example and the channel wavelength of each signal, whereas

DESCRIPTION OF THE PREFERRED EMBODIMENTS

In the following, embodiments of the optical multiplexer/demultiplexer according to the present invention will be explained with reference to FIGS. 2 to 4 and 5A to 6B. In the explanation in the drawings, parts identical to each other will be referred to with numerals or letters identical to each other without repeating their overlapping descriptions.

Figure 2:
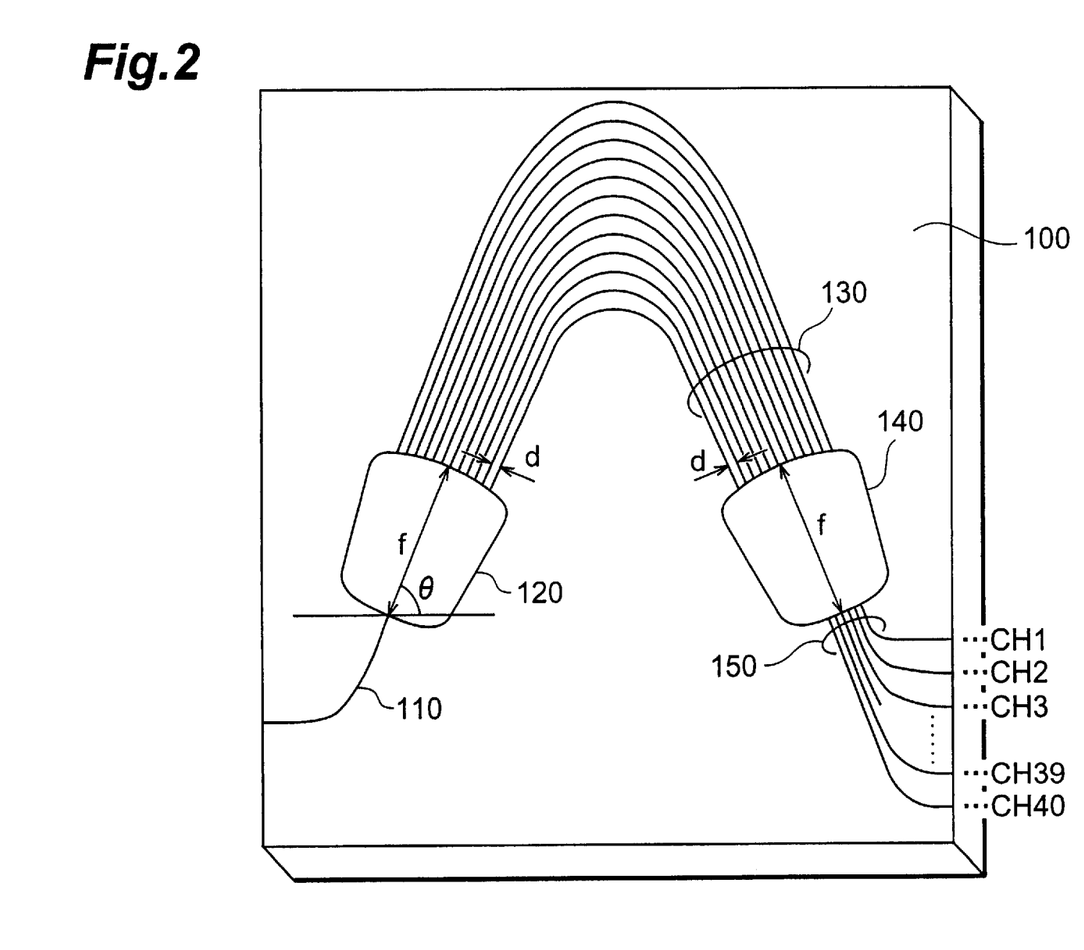
FIG. 2 is a view showing a configuration of the optical multiplexer/demultiplexer according to the present invention.

FIG. 2 is a view showing a configuration of the optical multiplexer/demultiplexer according to the present invention. As depicted, this optical multiplexer/demultiplexer is an optical component whose optical waveguide parts are integrally formed on a silica glass substrate 100. Namely, on the substrate 100, one or more input waveguides 110, a first slab waveguide 120, a plurality of channel waveguides 130, a second slab waveguide 140, and a plurality of output waveguides 150 are disposed. Each of the above-mentioned waveguide parts is doped with $GeO_2$, whereas the doping amount of $GeO_2$ is such that the relative refractive index difference between the silica substrate 100 and the waveguide parts is 1% or more in order to enable the channel waveguides 130 to lower their radius of curvature (improve the light-confining efficiency).

The first slab waveguide 120 is disposed so as to form an angle θ with respect to the angle of incidence of light entering the optical multiplexer/demultiplexer, whereas the first and second slab waveguides 120, 140 each have a slab length f. Here, the slab length corresponds to the focal length of the lens surface positioned at the light input end of each of the first and second slab waveguides 120, 140. The input waveguide 110 is a waveguide for guiding to the first slab waveguide 120 signals having respective channel wavelengths set as signal channels with a predetermined wavelength spacing, and has one end connected to the first slab waveguide 120. The channel waveguides 130 are waveguides, disposed on the substrate 100, having lengths different from each other. The channel waveguides 130, while being separated from each other at intervals of d at one end, are connected to the first slab waveguide 120 such that the first slab waveguide 120 is held between the input waveguide 110 and the channel waveguides 130; and, while being separated from each other at intervals of d at the other end, are connected to the second slab waveguide 140 such that the second slab waveguide 140 is held between the channel waveguides 130 and the output waveguides 150. The output waveguides 150 are waveguides each having one end connected to the second slab waveguide 140, and are disposed so as to correspond to individual signals having respective channel wavelengths set with a predetermined wavelength spacing. The optical multiplexer/demultiplexer shown in FIG. 2 is an AWG circuit capable of separating 40 channels of signals.

In particular, the optical multiplexer/demultiplexer according to the present invention is characterized in that at least the slab length f in the first and second slab waveguides 120, 140 and each interval of channel waveguides 130 at the respective end faces of the first and second slab waveguides 120, 140 are adjusted such that, in a power spectrum indicating a wavelength-transmission characteristic concerning an output light component from selected one of the output waveguides 150, a second channel wavelength adjacent a first channel wavelength corresponding to the selected one in channel wavelengths CH1 to CH40 of the signals exists within a wavelength region yielding an output light power lower than that at the first channel wavelength by 20 dB or more.

The adjustment mentioned above is carried out in order to realize a smaller size in the optical multiplexer/demultiplexer in a state where cross talk is effectively suppressed between adjacent channels. As actually required sizes, it is preferred that each interval d of channel waveguides 130 at the respective connection end faces of the first and second slab waveguides 120, 140 be 15 μm or less, and the slab length f in the first and second slab waveguides 120, 140 be 15 mm or less. For satisfying the demand for WDM transmissions in recent years, the number of channels corresponding to the number of signals is preferably 30 or more, whereas the channel wavelength spacing of individual signals is preferably 100 GHz or less.

Specifically, the inventors designed an AWG circuit which can separate 40 channels of signals having a signal wavelength spacing Δλ of 100 GHz.

In thus designed AWG circuit, the relative refractive index difference between the substrate 100 and each waveguide part is set at 1.5%, the width of each waveguide at 4.3 μm, the minimum radius of curvature $r_{min}$ in the channel waveguides 130 at 2 mm, the size of substrate 100 at 20 mm×20 mm, the thickness of substrate 100 at 0.5 mm, the slab length f at 9600 μm, the end part interval d of channel waveguides 130 at 12 μm, the end part interval d0 of output waveguides 150 on the input end side at 15 μm, the number of channel waveguides 130 at 180, the installing angle θ of slab waveguide 120 at 80°, the length difference ΔL between individual channel waveguides 130 at 36.702 μm, the center channel wavelength λ0 (corresponding to CH20) in the signals to be separated (40 channels of CH1 to CH40) at 1550 nm, and FSR (Free Spectral Range=(λ0·f·Δλ)/(N·d·d0)) at 43.57 nm (see FIG. 2).

Figure 3:
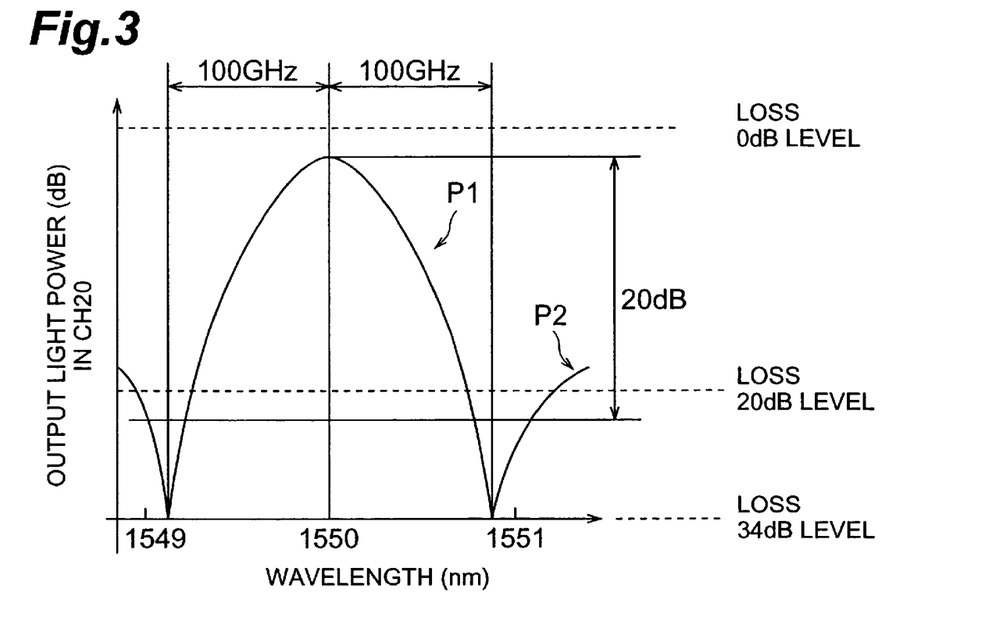
FIG. 3 is a graph showing a relationship between a power spectrum indicating a wavelength-transmission characteristic of output light power and channel wavelength concerning one of output waveguides in the optical multiplexer/demultiplexer according to the present invention.

FIG. 3 is a graph showing results of simulation of a relationship between a power spectrum of light outputted from an output waveguide 150 (waveguide for taking out light having a channel wavelength of 1550 nm) corresponding to the channel CH20 of the AWG circuit designed according to the condition mentioned above and channel wavelength.

As can be seen from the power spectrum of FIG. 3, the output light power spectrum from the output waveguide 150 corresponding to the channel CH20 in the AWG circuit designed according to the above-mentioned condition was such that, in a wavelength region yielding an output light power lower than that at the center channel wavelength of 1550 nm by 20 dB or more, an adjacent channel wavelength (channel wavelength separated from the center channel wavelength by a wavelength spacing of 100 GHz) existed, and this adjacent channel wavelength separated by 100 GHz yielded a loss of 34 dB. In thus designed AWG circuit, it was possible to adjust the position of a valley of peaks (a high-loss region between the main peak P1 and an adjacent side peak P2 or between side peaks) such that an adjacent side peak separated from the main peak P1 by 100 GHz exists between the main peak P1 having a peak wavelength at the center channel wavelength of 1550 nm and the side peak P2, adjacent the main peak P1, yielding an output light power difference of 20 dB or less between the output light power at the peak wavelength thereof and that at the channel wavelength of 1550 nm.

The positional adjustment of peak valleys with respect to channel wavelengths set with a predetermined wavelength spacing can be effected mainly by regulating the slab length f in the first and second slab waveguides 120, 140 and the interval d of channel waveguides 130 as can be seen from the description on page 231 (expression 191) of "Applied Optics I," Baifukan, Jul. 20, 1990 (the first edition). The inventors further simulated the loss at an adjacent channel wavelength separated from the center channel wavelength of 1550 nm by 100 GHz when the channel waveguide interval d and slab length f were changed. Here, the FSR and other structural parameters are identical to those of the above-mentioned design condition.

Figure 4:
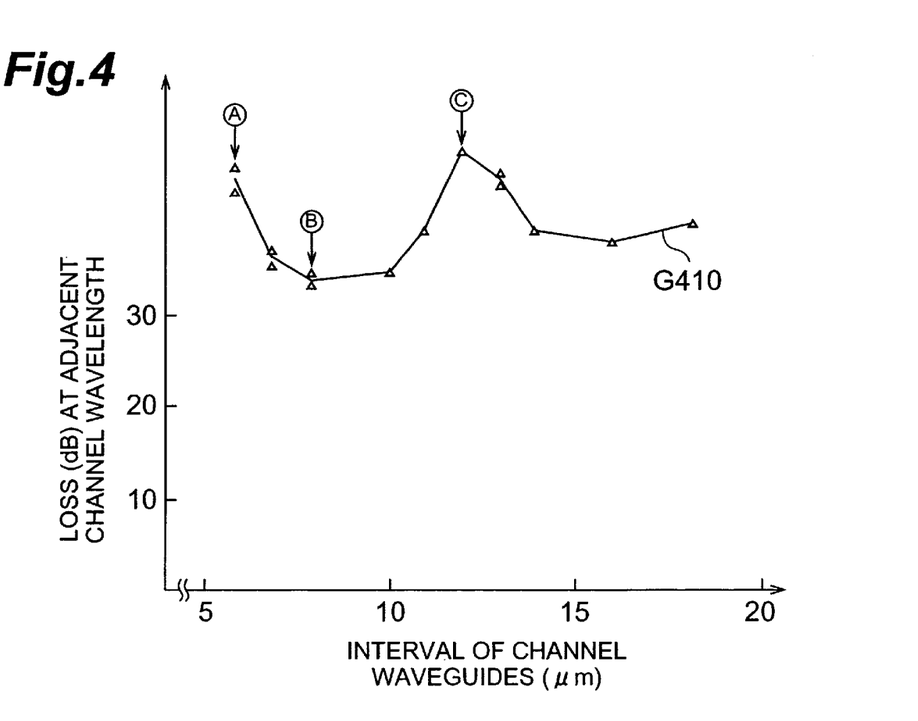
FIG. 4 is a graph showing results of measurement of relationship between channel waveguide interval and one of output waveguides obtained at different slab lengths.

FIG. 4 is a graph showing a relationship between the interval d of channel waveguides 130 and the loss at an adjacent channel wavelength separated from the center channel wavelength by 100 GHz. For keeping the FSR constant, the slab length f and interval d satisfy a relationship in which f/d becomes constant. From FIG. 4, it is seen that loss can be controlled at the adjacent channel wavelength if the interval d is changed.

Figure 5A:
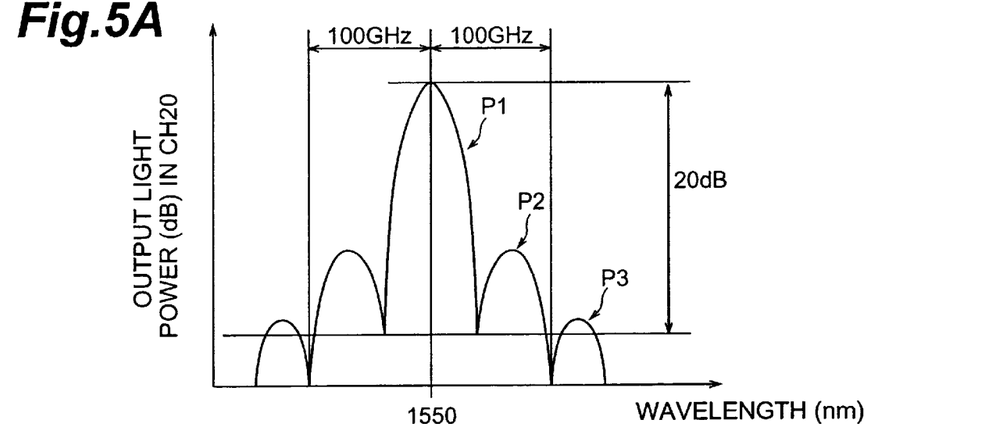
FIGS. 5A to 5C are graphs, each showing a relationship between a power spectrum indicating a wavelength-transmission characteristic of output light power and channel wavelength concerning one of output waveguides in the optical multiplexer/demultiplexer according to the present invention, representing respective cases where the slab length and channel waveguide interval are set under the conditions specified by arrows A, B, and C in the graph shown in FIG. 4.
Figure 5B:
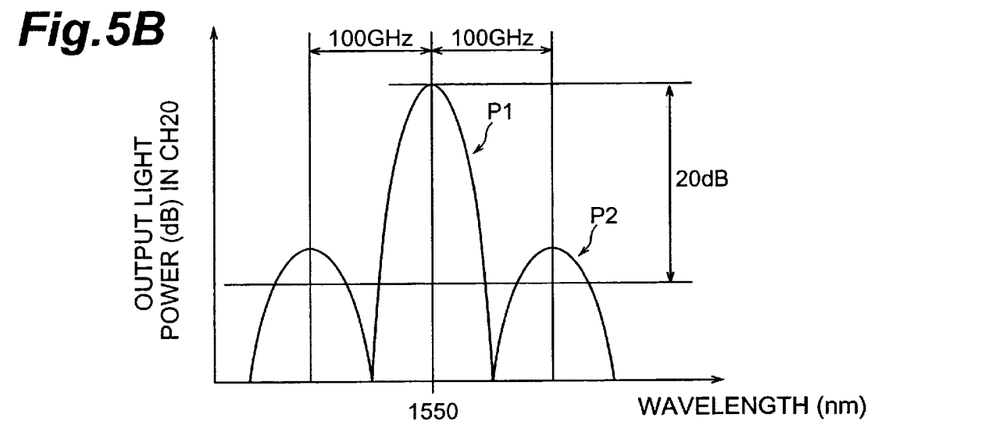
Figure 5C:
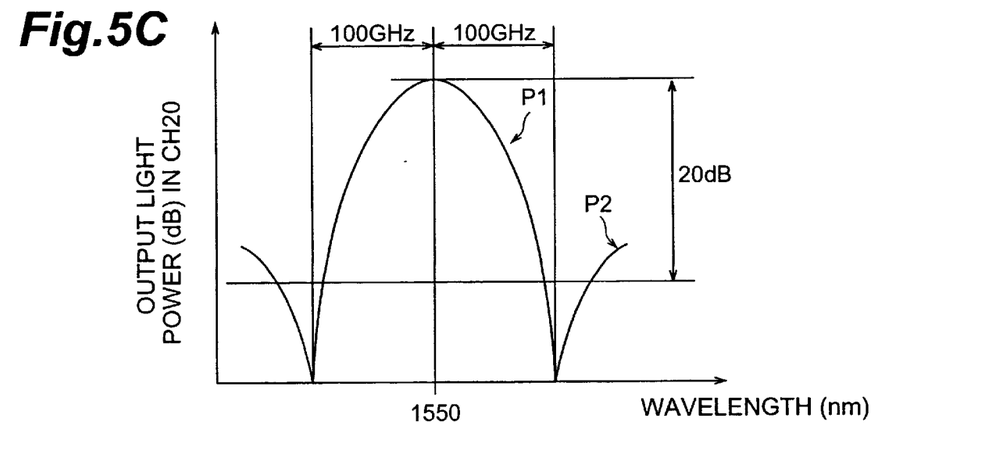

FIGS. 5A to 5C show respective output light power spectra from the output waveguide corresponding to the channel CH20 under conditions indicated by arrows A to C in the curve G410 of FIG. 4, respectively.

In the case where the slab length f and the interval d of channel waveguides 130 satisfy the condition indicated by arrow A in FIG. 4, the output light power spectrum from the output waveguide corresponding to the channel CH20 has a shape such as the one shown in FIG. 5A. In this case, at least the peak wavelength of the side peak P2 adjacent the main peak P1 having a peak wavelength that the center channel wavelength of 1550 nm exists within a wavelength region between the center channel wavelength of 1550 nm and an adjacent channel wavelength thereof separated by 100 GHz. The adjacent channel wavelength separated from the center channel wavelength of 1550 nm by 100 GHz exists within a region (between side peaks P2, P3) yielding an output light power lower than that at the peak wavelength of main peak P1 by 20 dB or more, whereby it is seen that the cross talk between adjacent channels is effectively lowered if the AWG circuit is designed so as to satisfy the condition indicated by arrow A.

Under the condition indicated by arrow B in FIG. 4, the output light power spectrum from the output waveguide corresponding to the channel CH20 has a shape such as the one shown in FIG. 5B. In this case, an adjacent channel wavelength separated from the center channel wavelength of 1550 nm by 100 GHz exists in the vicinity of the side peak P2 adjacent the main peak P1 having a peak wavelength at the center channel wavelength of 1550 nm, whereby the cross talk between adjacent channels cannot fully be lowered under the condition indicated by arrow B.

In the case where the condition indicated by arrow C in FIG. 4 is satisfied, the output light power spectrum from the output waveguide corresponding to the channel CH20 has a shape such as the one shown in FIG. 5C. In this case, an adjacent channel wavelength separated from the center channel wavelength of 1550 nm by 100 GHz exists within a region, between the main peak P1 and the side peak P2, yielding an output light power lower than that at the peak wavelength of main peak P1 by 20 dB or more, whereby it is seen that the cross talk between adjacent channels is effectively lowered if the AWG circuit is designed so as to satisfy the condition indicated by arrow C.

As in the foregoing, appropriately setting the slab length f and channel waveguide interval d yields an AWG circuit (optical multiplexer/demultiplexer of AWG type) having effectively lowered the cross talk occurring between adjacent channels as the circuit is made smaller. Namely, if the slab length f in the first and second slab waveguides 120, 140 and each interval d of channel waveguides 130 at respective connection end faces of the first and second slab waveguides 120, 140, which greatly contribute to changing the form of the above-mentioned power spectrum, are mainly adjusted, then, in each of the output waveguides 150, light components other than its corresponding channel wavelength of light, such as light components having wavelengths adjacent the channel wavelength in particular, are effectively attenuated. As a result, cross talk is effectively restrained from occurring between adjacent channels as the optical multiplexer/demultiplexer is made smaller.

The optical multiplexer/demultiplexer according to the present invention may be designed such that channel wavelengths other than the center channel wavelength shift from the peak wavelength of each peak by 20% or more. This is because of the fact that an effect of lowering cross talk can fully be obtained in this case as well.

Specifically, an adjacent channel wavelength (second channel wavelength) separated from the center channel wavelength (second channel wavelength) is set such that the signal wavelength spacing from the first channel wavelength to the second channel wavelength is greater or smaller than the wavelength spacing from the first channel wavelength to the peak wavelength of a first side peak adjacent the main peak by 20% or more. Namely, if the second channel wavelength is shifted from the peak wavelength of the adjacent first side peak by a predetermined wavelength spacing or greater, then the cross talk between adjacent channels can fully be lowered in each output waveguide 150. Further, in this case, it is preferred that a third channel wavelength, different from the first channel wavelength and separated from the second channel wavelength by a predetermined wavelength spacing, be set such that the signal wavelength spacing from the first channel wavelength to the third channel wavelength is greater or smaller than the wavelength spacing from the first channel wavelength to the peak wavelength of a second side peak adjacent the first side peak by 20% or more.

Specifically, the inventors designed slab AWG circuits mainly different from each other in their slab lengths and intervals of channel waveguides 130, and simulated the relationship between the output power spectrum from the output waveguide corresponding to the channel CH20 and wavelength in each of them.

The AWG circuit designed as a comparative example is an AWG circuit which can separate 40 channels of signals having a signal wavelength spacing $\Delta\lambda$ of 50 GHz. In the AWG circuit designed as the comparative example, the relative refractive index difference between the substrate 100 and each waveguide part is set at 1.5%, the width of each waveguide at 4.3 $\mu$m, the minimum radius of curvature $r_{min}$ in the channel waveguides 130 at 2 mm, the size of substrate 100 at 20 mm×20 mm, the thickness of substrate 100 at 0.5 mm, the slab length f at 6400 $\mu$m, the end part interval d of channel waveguides 130 at 8 $\mu$m, the end part interval d0 of the output waveguides 150 on the input end side at 7.5 $\mu$m, the number of channel waveguides 130 at 180, the installing angle θ of slab waveguide 120 at 80°, the length difference ΔL between individual channel waveguides 130 at 36.702 μm, and the channel wavelength λ0 (corresponding to CH20) to become the center of 40 channels of CH1 to CH40 at 1550 nm (see FIG. 2).

Figure 6A:
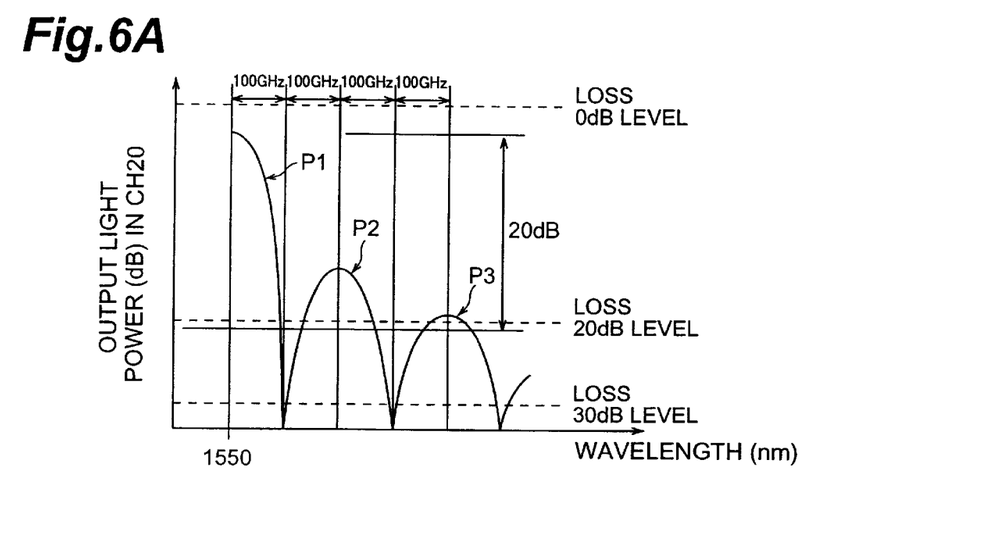

FIG. 6A is a graph showing results of simulation of a relationship between a power spectrum of light outputted from the output waveguide 150 corresponding to the channel CH20 (waveguide prepared for outputting light having a channel wavelength of 1550 nm) and channel wavelength in the AWG circuit as the comparative example designed according to the condition mentioned above. In the comparative example designed under the above-mentioned condition, as can be seen from this graph, a part of channel wavelengths is located in the vicinity of the peak wavelength of each side peak between peaks adjacent each other (there exists a channel wavelength yielding an output light power difference of 20 dB or less from the center channel wavelength), whereby it is seen that the above-mentioned design condition is insufficient for fully lowering the cross talk between adjacent channels.

Figure 6B:
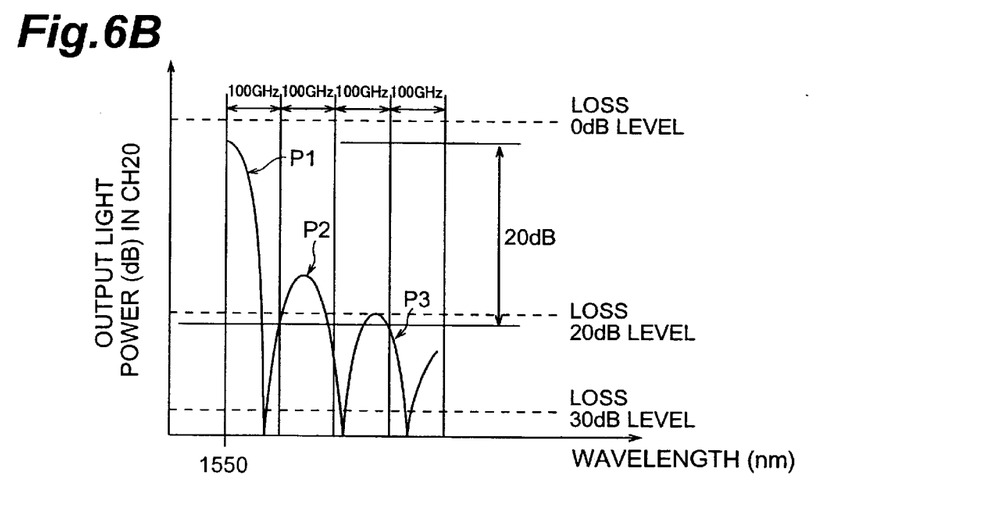
FIG. 6B is a graph showing a relationship between an output light power spectrum of an optical multiplexer/demultiplexer whose slab length and channel waveguide interval are set as a preferred example and the channel wavelength of each signal.

On the other hand, the power spectrum shown in FIG. 6B is an output power spectrum from the output waveguide corresponding to the channel CH20, representing results of simulation of an AWG circuit (AWG circuit capable of separating 40 channels of signals having a signal wavelength spacing Δλ of 50 GHz) in which, in the above-mentioned design condition, the slab length f is changed to 5600 μm, and the interval d of channel waveguides 130 is changed to 7 μm. Since this AWG circuit is designed such that the peak wavelength of a side peak exists between channel wavelengths other than the center channel wavelength in each of the output waveguides 150, i.e., at least channel wavelengths excluding the center wavelength shift from the peak wavelength of each side peak by ±20% or more, the cross talk between adjacent channels is effectively lowered in each of the output waveguides 150.

According to the present invention, as in the foregoing, the slab length and channel waveguide interval are mainly adjusted such that, in a power spectrum indicating a wavelength-transmission characteristic concerning an output light component from selected one of output waveguides disposed so as to correspond to respective signals having channel wavelengths set with a predetermined wavelength spacing, an adjacent channel wavelength exists within a wavelength region yielding an output light power lower than that at the channel wavelength corresponding to the selected one by 20 dB or more. Consequently obtained is a small-size optical multiplexer/demultiplexer which is excellent in spectral characteristics or the like and effectively lowers the cross talk between adjacent channels occurring as it is made smaller.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical multiplexer/demultiplexer comprising:
   a substrate;
   first and second slab waveguides, provided on said substrate, each having a predetermined slab length;
   one or more input waveguides, disposed on said substrate, each having one end connected to said first slab waveguide;
   a plurality of output waveguides, provided on said substrate, each having one end connected to said second slab waveguide, said output waveguides being provided so as to correspond to individual signals having respective channel wavelengths set as signal channels with a predetermined wavelength spacing; and
   a plurality of channel waveguides, provided on said substrate, each having one end connected to said first slab waveguide such that said first slab waveguide is sandwiched between said input waveguide and said channel waveguides, and the other end connected to said second slab waveguide such that said second slab waveguide is sandwiched between said channel waveguides and said output waveguides, said channel waveguides having lengths different from each other;
   wherein at least the slab lengths in said first and second slab waveguides and the channel waveguide intervals at respective connection end faces of said first and second slab waveguides are adjusted such that, in a power spectrum indicating a wavelength-transmission characteristic concerning an output light component from selected one of said output waveguides, a second channel wavelength adjacent a first channel wavelength corresponding to said selected one in said channel wavelengths of signals exists within a wavelength region yielding an output light power lower than that at said first channel wavelength by 20 dB or more.

2. An optical multiplexer/demultiplexer according to claim 1, wherein at least the slab lengths in said first and second slab waveguides and the channel waveguide intervals at respective connection end faces of said first and second slab waveguides are adjusted such that said second channel wavelength exists between a main peak having a peak wavelength at said first channel wavelength and a first side peak, adjacent said main peak, yielding a power difference of 20 dB or less between the output light power at the peak wavelength thereof and the output light power at said first channel wavelength.

3. An optical multiplexer/demultiplexer according to claim 2, wherein at least the slab lengths in said first and second slab waveguides and the channel waveguide intervals at respective connection end faces of said first and second slab waveguides are adjusted such that a third channel wavelength, adjacent said second channel wavelength and different from said first channel wavelength, exists between a first side peak and a second side peak, adjacent said first side peak, yielding a difference of 20 dB or less between the output light power at the peak wavelength thereof and the output light power at said first channel wavelength.

4. An optical multiplexer/demultiplexer according to claim 1, wherein at least the slab lengths in said first and second slab waveguides and the channel waveguide intervals at respective connection end faces of said first and second slab waveguides are adjusted such that at least the peak wavelength of a first side peak adjacent a main peak having a peak wavelength at said first channel wavelength exists within a wavelength region between said first and second channel wavelengths.

5. An optical multiplexer/demultiplexer according to claim 1, wherein each of the channel waveguide intervals at respective connection end faces in said first and second slab waveguides is 15 μm or less.

6. An optical multiplexer/demultiplexer according to claim 1, wherein each of the slab lengths in said first and second slab waveguides is 15 mm or less.

7. An optical multiplexer/demultiplexer according to claim 1, wherein the relative refractive index difference between said substrate and the waveguides through which said signals propagate is 1% or more.

8. An optical multiplexer/demultiplexer according to claim 1, wherein the number of channels corresponding to the number of said signals is 30 or more.

9. An optical multiplexer/demultiplexer according to claim 1, wherein the channel wavelength spacing of said individual signals is 100 GHz or less.

10. An optical multiplexer/demultiplexer according to claim 2, wherein said second channel wavelength is set such that the signal wavelength spacing from said first channel wavelength to said second channel wavelength is greater or smaller than the wavelength spacing from said first channel wavelength to the peak wavelength of said first side peak by 20% or more.

11. An optical multiplexer/demultiplexer according to claim 3, wherein said third channel wavelength is set such that the signal wavelength spacing from said first channel wavelength to said third channel wavelength is greater or smaller than the wavelength spacing from said first channel wavelength to the peak wavelength of said second side peak by 20% or more.

* * * * *